United States Patent [19]

Ennis

[11] 3,711,883
[45] Jan. 23, 1973

[54] VEHICLE SPRAYING AND SCRUBBING DEVICE

[76] Inventor: George Thomas Ennis, 1354 East State Street, Sharon, Pa.

[22] Filed: Sept. 7, 1971

[21] Appl. No.: 178,192

[52] U.S. Cl. .............................. 15/97 R, 15/DIG. 2
[51] Int. Cl. ................................. B60s 3/00
[58] Field of Search ...... 15/DIG. 2, 21 R, 21 D, 21 E, 15/97, 302

[56] References Cited

UNITED STATES PATENTS

| 3,499,180 | 3/1970 | Hurwitz | 15/97 R |
| 3,517,405 | 6/1970 | Hanna et al. | 15/97 R |
| 3,673,626 | 7/1972 | Lieffring | 15/97 R |

Primary Examiner—Edward L. Roberts
Attorney—Harold J. Birch et al.

[57] ABSTRACT

A vehicle washing apparatus comprising a movable carrier frame with scrubbing means depending therefrom positioned on a supporting framework over the path of a vehicle to be washed. Drive means are adjustably connected to the carrier frame for oscillating the scrubbing means back and forth transversely of the path. A liquid conduit supplied with liquid under pressure for discharge through nozzle means is pivotally mounted for oscillating movement around its vertical axis. Link means adjustably connect the conduit to the carrier frame to oscillate the conduit in conjunction with the oscillating movement of the carrier frame and scrubbing means.

9 Claims, 3 Drawing Figures

INVENTOR
GEORGE THOMAS ENNIS

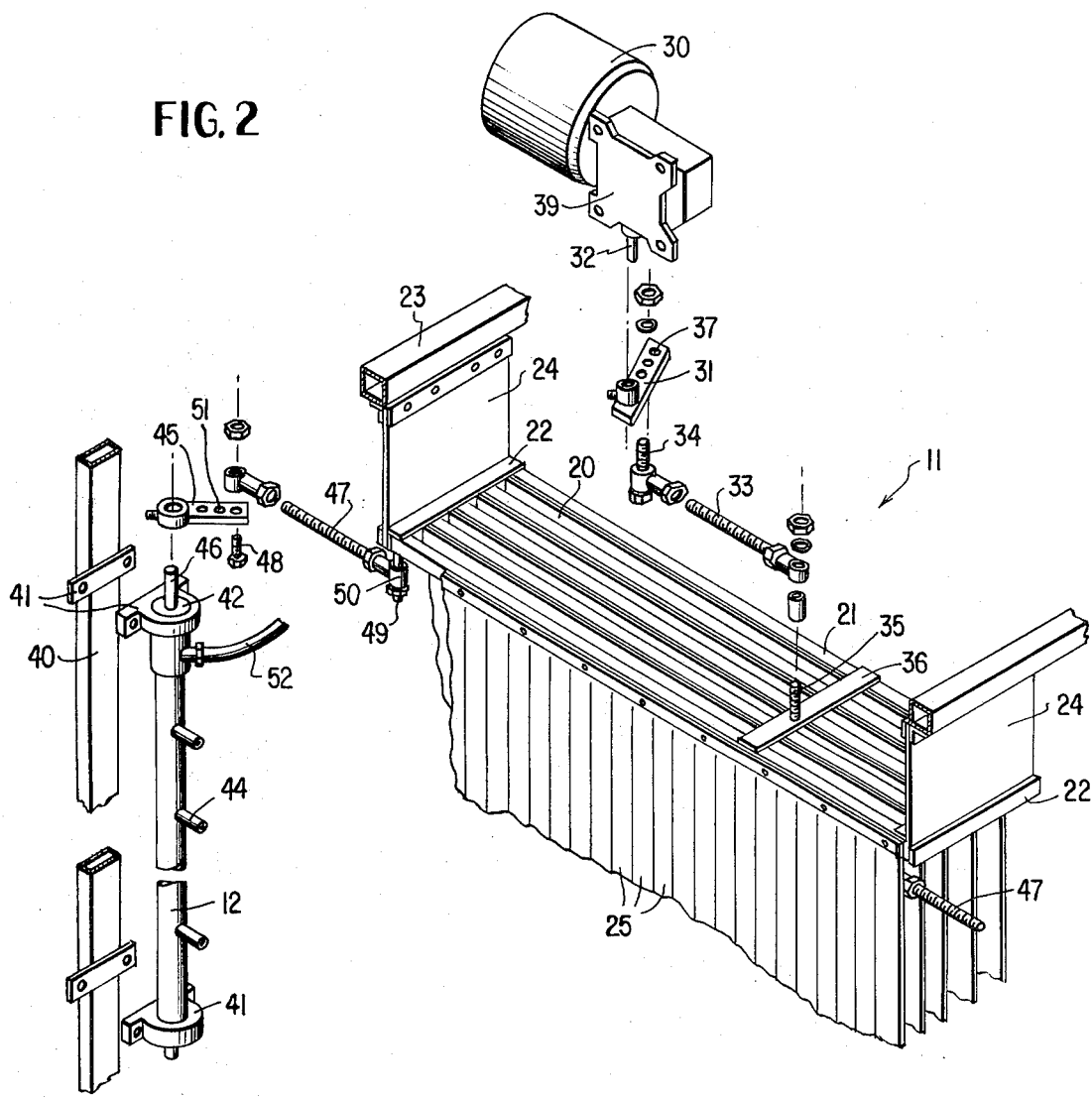
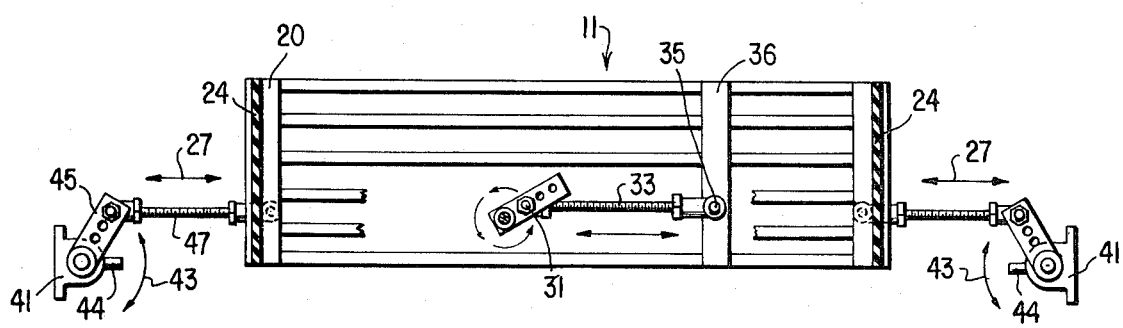
INVENTOR
GEORGE THOMAS ENNIS

VEHICLE SPRAYING AND SCRUBBING DEVICE

BACKGROUND OF THE INVENTION

1. Field of the Invention

This invention relates generally to vehicle washing apparatus and, more particularly, to such an apparatus employing an oscillating scrubbing means movable in combination with an oscillating liquid conduit.

2. Definition of the Prior Art

Various prior art devices have heretofore been known for scrubbing the top of a vehicle and spraying a cleaning fluid on a vehicle prior to its being washed. Many such prior art devices, however, have suffered from the disadvantage of being unduly complicated and expensive to manufacture and maintain. Other such prior art devices have not adequately provided means for properly spraying a cleaning fluid on a vehicle to be washed.

SUMMARY OF THE INVENTION

Among the objects of the present invention is to avoid the disadvantage of prior art washing devices for vehicles enumerated above. Another object of the present invention is to provide a vehicle washing apparatus which provides means for adequately spraying a cleaning fluid or liquid on a vehicle at the initiation of the cleaning cycle. A further object is to provide a vehicle washing apparatus employing an oscillating top scrubbing means in combination with an oscillating liquid conduit for applying a fluid to the vehicle as a washing cycle is started. Still another object of the invention is to provide a vehicle washing apparatus which is simple in construction.

According to the present invention, there is provided a vehicle washing apparatus which includes framework extending over a predetermined path of a vehicle to be washed. A movable frame for carrying scrubbing means for cleaning the top of the vehicle is suspended from the framework by flexible supporting means to permit the carrier frame to be oscillated transversely back and forth across the path of the vehicle. A liquid conduit is pivotally mounted on each side of the path for oscillating movement around a vertical axis. Nozzles are provided on each of the conduits for spraying liquid on a vehicle moving along the path. Adjustable link means connect the conduit to the top scrubbing means whereby the drive means which causes the scrubbing means to oscillate back and forth also functions to oscillate the liquid conduits around their vertical axes. The nozzles on the conduits are mounted to alternately face in the direction of the vehicle advancing along the path so that, as the vehicle moves further along the path, oscillation of the conduits causes the nozzles to spray a substantial portion of the car during each oscillating movement.

BRIEF DESCRIPTION OF THE DRAWINGS

Other objects and advantages of the invention will become apparent by reference to the more detailed description of the invention and the accompanying drawings which follow, wherein:

FIG. 2 is an exploded view, in perspective, illustrating the essential operating parts of the vehicle washing device of the present invention; and FIG. 3 is a view taken along line 3.3 of FIG. 1.

DESCRIPTION OF THE INVENTION

Figure 1:
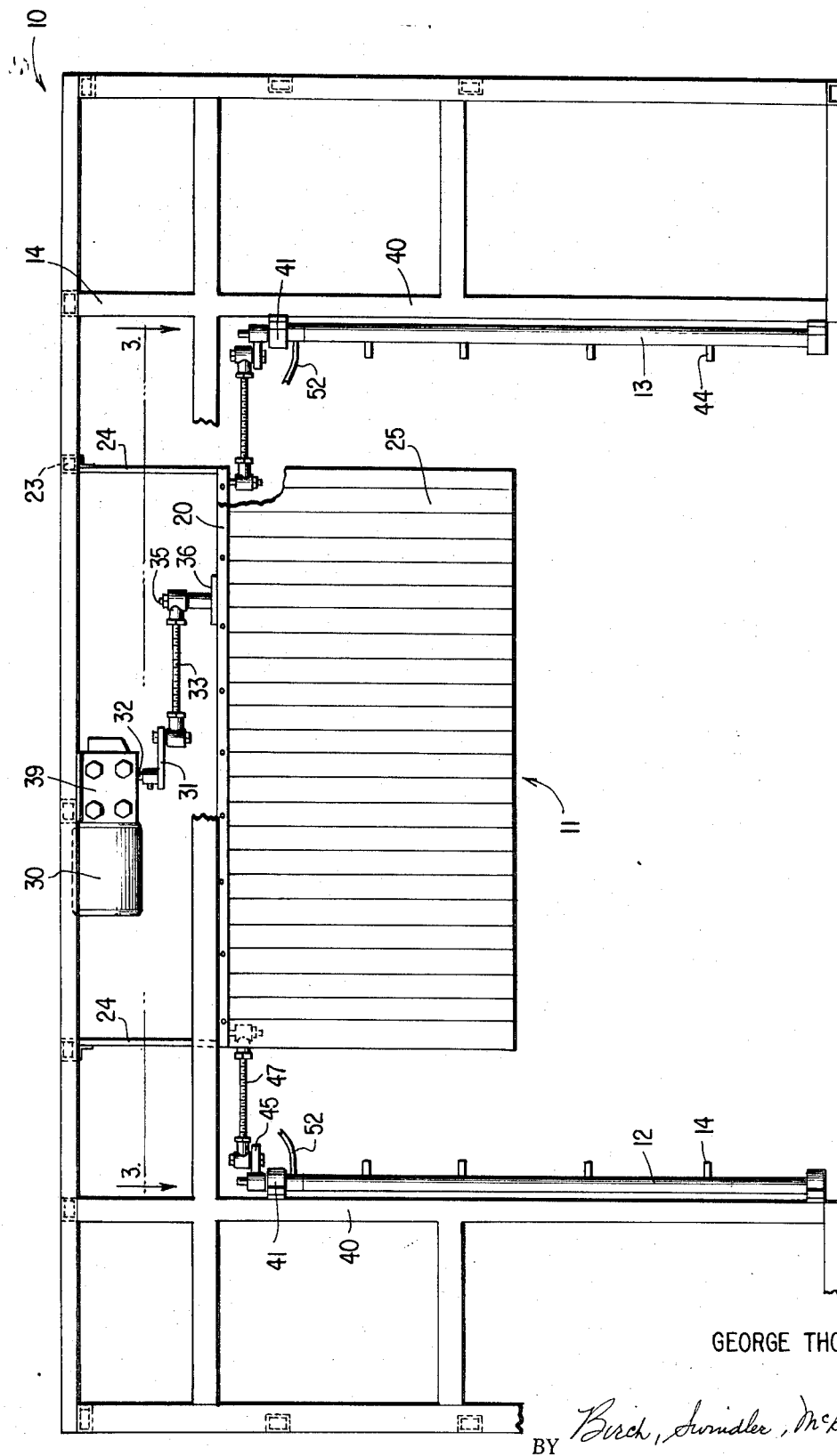
FIG. 1 is a front elevational view of a vehicle washing device according to the present invention.

Referring to the drawings, there is shown a vehicle washing apparatus 10 according to the present invention generally comprising a top scrubbing assembly 11 and a pair of pre-applicator conduits 12 and 13 mounted on a suitable frame means generally indicated by the numeral 14. The frame means includes suitable side frame members connected by top frame members extending along the path of a vehicle to be washed.

The top scrubber assembly 11 includes a carrier frame 20 comprised of a plurality of horizontal supporting bars 21 connected at their ends by cross members or braces 22. The carrier frame 20 is suspended from top cross beams 23 of the supporting frame 14 by a pair of hanger means 24. As shown in FIGS. 1 and 2, a hanger 24 is attached at each end of the carrier frame 20. In a preferred embodiment, the hanger means are each comprised of a strip of flexible material such as rubber to permit oscillating movement of the carrier frame 20. A plurality of scrubbing strips 25 are attached to and depend from each of the supporting bars 21 of the carrier frame 20 to form a plurality of rows of scrubbing strips as shown in the exploded view of FIG. 2. Each of the scrubbing strips 25 preferably is comprised of a flexible material or cloth such as felt. The scrubbing strips are attached to each of the bars 21 by a second bar 26 bolted to each of the bars 21.

The entire top scrubbing assembly 21 is mounted for oscillating movement back and forth transversely of the path of the vehicle, as shown by the arrows 27 in FIG. 3. Suitable power means, such as an electrical motor 30, are provided to operate the scrubbing assembly. The motor 30 is attached to the frame 14 by suitable bracket means 39. The motor 30 is connected to the carrier frame 20 of the scrubbing assembly by suitable connecting means comprised of a speed adapter arm 31 mounted on a rotating shaft 32 connected to the motor 30. A threaded connecting rod 33 is attached at one end by bolt means 34 to the adapter arm 31 and at its opposite end to the carrier frame 20 by means of a second bolt means 35 mounted on a cross brace 36 on the carrier frame. The adapter arm 31 is provided with a plurality of openings 37 to vary the travelling distance of the carrier frame. It will be apparent from FIGS. 1 and 2 that rotation of the adapter arm 31 by the shaft 32 connected to motor 30 will cause the connecting rod 33, and consequently the scrubbing assembly 11, to oscillate back and forth a predetermined distance.

Mounted adjacent each end of the scrubbing assembly 11 on each side of the vehicle path are the liquid conduits 12 and 13, as shown in FIG. 1. The conduits 12 and 13 are connected to side frame members 40 by suitable bracket means 41. A bearing 42 is provided in each bracket means 41 whereby each of the conduits 12 and 13 is free to rotate about its vertical axis predetermined angle as indicated by the arrows 42 in FIG. 3.

A plurality of nozzles 44 are mounted on each of the conduits 12 and 13. As shown in FIGS. 1 and 2, the nozzles 44 are mounted to extend horizontally inwardly from each of the conduits. As further shown in FIGS. 1 and 3, when the top scrubbing assembly 11 is in a position over the center of the path of the vehicle, the nozzles on both of conduits 12 and 13 face inwardly. When the top scrubbing assembly is moved to either side, it is apparent that the nozzles on the conduit at the side of the washing apparatus towards which the scrubbing assembly moves are rotated in a direction along the path of the vehicle, whereas the nozzles on the conduit on the opposite side of the washing apparatus move in an opposite direction to initially face in the direction of the advancing vehicle.

Oscillating movement of each of the conduits 12 and 13 is effected by link connecting means between the top scrubbing assembly 11 and each of the conduits 12 and 13. As shown in FIGS. 1 and 2, this link connecting means includes an oscillating arm 45 fixedly mounted to a shaft 46 attached to the top of each of the conduits. A threaded connecting rod 47 is attached at one end to the arm 45 by suitable bolt means 48 and at its opposite end is pivotally connected by a sleeve 50 to a rod 49 connected to the carrier frame 20 of the top scrubbing assembly 11. Arm 45 is provided with a plurality of openings 51 to adjust the point at which the connecting rod 47 is attached to the arm in order to vary the degree of rotation of the conduits 12 and 13. The connecting means is constructed to permit the conduits 12 and 13 to rotate through an included angle of at least 90° around their vertical axes to insure that a substantial portion of a vehicle is spread by the liquid coming from the nozzles 44 prior to the vehicle contacting the top scrubbing assembly 11.

Suitable means, such as a hose 52, are provided for furnishing a fluid under pressure to the conduits 12 and 13. The pressure may be varied from a low to a high pressure, as desired. It is thus clear that the motor means 30 which oscillates the top scrubbing assembly 11 also furnishes the power means for oscillating the conduits 12 and 13 through the link connections, as described.

The operation of the vehicle washing apparatus of the present invention is best illustrated by the arrows of the drawing in FIG. 3. Thus, as a vehicle approaches the washing apparatus 10, suitable control means are activated by the vehicle to initiate operation of the motor 30 and to provide fluid under pressure to the conduits 12 and 13. Operation of the motor 30 causes shaft 32 to rotate which, in turn, rotates arm 37 to cause connecting rod 33 to move back and forth and consequently cause the entire top scrubbing assembly 11 to oscillate back and forth transversely of the path of the vehicle. The same oscillating movement of the top scrubbing assembly 11 causes the connecting rod 47 to move back and forth which, in turn, pivots arm 45 through a predetermined angle to consequently cause the conduits 12 and 13 and their nozzles to rotate through a predetermined angle to effect spraying of the liquid supplied to the conduits on a substantial portion of the vehicle prior to its contact with the top scrubbing assembly. The strips 25 of the top scrubbing assembly 11 are of sufficient length to contact and wash the hood as well as the top and trunk of a vehicle as the vehicle passes under the top scrubbing assembly during its passage through the vehicle washing apparatus.

The advantages of the present invention are readily apparent from the description above. By attaching the conduits to the top scrubbing assembly, a very simple and efficient mechanism is employed for oscillating both the top scrubbing assembly and the conduits through use of single power means. This of course permits the washing apparatus to be economical in construction. Moreover, by oscillating the liquid conduits 12 and 13, an effective means is provided for contacting a substantial portion of the vehicle with a liquid prior to its contact with the scrubbing means. The flexible hanger means 24 provide an effective method of mounting the top scrubbing assembly for oscillating movement. By providing the adapter arms 31 and 45 with a plurality of openings, a simple means is employed for varying the distance of travel of the top scrubber assembly as well as the angle of rotation of the liquid conduits.

Although the present invention has been illustrated and described with reference to a specific embodiment, it will be understood that various modifications may be made by persons skilled in the art without departing from the spirit of the invention which is defined solely by the appended claims.

I claim:

1. A vehicle washing apparatus comprising
   a. a supporting framework extending over a predetermined path of a vehicle to be washed,
   b. a movable carrier frame over said path supported by said framework,
   c. vehicle scrubbing means attached to and depending from said carrier frame to contact a vehicle travelling along said path,
   d. drive means connected to said carrier frame for oscillating said carrier frame and scrubbing means back and forth transversely of said path,
   e. a liquid conduit pivotally mounted at one side of said path for oscillating movement around its vertical axis,
   f. nozzle means on said conduit for spraying liquid on a vehicle moving along said path, and
   g. link means connecting said conduit and said carrier frame to cause said conduit to oscillate about its vertical axis as said carrier frame oscillates back and forth.

2. A vehicle washing apparatus according to claim 1 wherein said carrier frame is suspended from said framework by flexible hanger means.

3. A vehicle washing apparatus according to claim 2 wherein said flexible hanger means comprise a rubber strip attached adjacent each end of said carrier frame.

4. A vehicle washing apparatus according to claim 1 wherein said nozzle means comprises a plurality of nozzles mounted on said conduit to initially face in the direction of a vehicle advancing along said path.

5. A vehicle washing apparatus according to claim 4 wherein said conduit rotates through an included angle of at least 90°.

6. A vehicle washing apparatus according to claim 4 which includes means for supplying liquid under pressure to said conduit.

7. A vehicle washing apparatus according to claim 1 which includes a vertical liquid conduit with nozzle means on each side of said path connected by link means to said carrier frame and mounted for oscillating movement therewith around its vertical axis.

8. A vehicle washing apparatus according to claim 1 wherein said drive means includes adjustable connecting means to vary the length of movement of said carrier frame and scrubbing means.

9. A vehicle washing apparatus according to claim 1 wherein said link means includes adjustable connecting means to vary the degree of oscillating movement of said conduit around its vertical axis.

* * * * *